United States Patent [19]

Burkert et al.

[11] Patent Number: 4,465,599

[45] Date of Patent: Aug. 14, 1984

[54] FLOCCULANTS BASED ON POLYMERS CONTAINING WATER-SOLUBLE DIALKYLAMINONEOPENTYL (METH)ACRYLATES

[75] Inventors: Hans Burkert; Jüergen Hartmann; Dietmar Jung, all of Ludwigshafen; Wilfried Heide, Erpolzheim; Heinrich Hartmann; Herbert Spoor, both of Limburgerhof, all of Fed. Rep. of Germany

[73] Assignee: BASF Aktiengesellschaft, Ludwigshafen, Fed. Rep. of Germany

[21] Appl. No.: 385,317

[22] Filed: Jun. 4, 1982

[30] Foreign Application Priority Data

Sep. 5, 1981 [DE] Fed. Rep. of Germany ....... 3135279

[51] Int. Cl.$^3$ ............................................. C02F 11/14
[52] U.S. Cl. .................................... 210/734; 210/733
[58] Field of Search ............... 210/725, 727, 728, 734, 210/609, 733; 526/312

[56] References Cited

U.S. PATENT DOCUMENTS

| | | | |
|---|---|---|---|
| 3,023,162 | 2/1962 | Fordyce et al. | 210/734 |
| 3,776,892 | 12/1973 | Bleyle | 210/734 |
| 3,943,114 | 3/1976 | Hore | 210/734 |

FOREIGN PATENT DOCUMENTS

| | | | |
|---|---|---|---|
| 2432699 | 9/1977 | Fed. Rep. of Germany . | |
| 2934086 | 4/1981 | Fed. Rep. of Germany . | |
| 52-71391 | 6/1977 | Japan | 210/734 |
| 1341972 | 12/1973 | United Kingdom | 210/734 |
| 1388399 | 3/1975 | United Kingdom | 210/734 |

Primary Examiner—Peter A. Hruskoci
Attorney, Agent, or Firm—Oblon, Fisher, Spivak, McClelland & Maier

[57] ABSTRACT

Flocculants based on polymers of neutralized or quaternized di-$C_1$-$C_3$-alkylaminoneopentyl (meth)acrylates and copolymers thereof are used for clarifying waste water and for flocculating sludges.

3 Claims, No Drawings

FLOCCULANTS BASED ON POLYMERS CONTAINING WATER-SOLUBLE DIALKYLAMINONEOPENTYL (METH)ACRYLATES

German Pat. No. 2,432,699 disclosed a process for the preparation of sedimentation-stable water-in-oil dispersions of acrylamide polymers, in which process a water-in-oil emulsion of an aqueous acrylamide solution, which may contain not more than 50% by weight of other water-soluble, ethylenically unsaturated monomers, is polymerized in a hydrophobic organic dispersion medium in the presence of a water-in-oil emulsifier, of a wetting agent having a HLB value greater than 10, and of a polymerization initiator. Other suitable water-soluble, ethylenically unsaturated monomers include aminoalcohol esters of acrylic acid or methacrylic acid. The known copolymers are used, for example, as flocculants for clarifying aqueous systems, and in the treatment of waste water.

German Laid-Open Application DOS No. 2,934,086 discloses emulsion polymers containing (a) from 5 to 100% by weight of a dialkylaminoneopentyl ester of an ethylenically unsaturated polymerizable carboxylic acid and (b) from 0 to 95% by weight of a water-insoluble or at most slightly water-soluble comonomer, (a) and (b) totaling not less than 90% by weight of the polymer, the remainder of which can be built up from water-soluble comonomers. These emulsion polymers are in the form of aqueous dispersions, and are used as thickeners for aqueous systems which have a pH of less than 7.

Where water-soluble dialkylaminoalkyl (meth)acrylate-containing polymers have hitherto been used as flocculants, their effectiveness decreases rather rapidly if they are in the form of an aqueous solution, and after prolonged storage they become virtually ineffective as flocculants.

It is an object of the present invention to provide water-soluble flocculants, for clarifying waste water and sludges, which can be stored in aqueous solution for a prolonged period without a noticeable drop in effectiveness.

We have found that this object is achieved, according to the present invention, by flocculants based on water-soluble homopolymers of neutralized or quaternized di-$C_1$-$C_3$-alkylaminoneopentyl (meth)acrylates and/or on water-soluble copolymers which contain not less than 5% by weight of neutralized or quaternized di-$C_1$-$C_3$-alkylaminoneopentyl (meth)acrylate as copolymerized units, the homopolymers and copolymers having a K value of from 150 to 300.

The homopolymers and copolymers can be prepared in a conventional manner by polymerization of the monomers, for example by polymerization in a water-in-oil emulsion by the process disclosed in German Pat. No. 1,089,173 or by the reverse suspension polymerization process disclosed in German Pat. No. 1,081,228, or by solution polymerization in water or precipitation polymerization in an inert organic solvent. All these processes use the conventional polymerization initiators, eg. peroxides, redox catalysts or azo initiators, such as azo-bis-iso-butyronitrile. Homopolymers are prepared by polymerization of di-$C_1$-$C_3$-alkylaminoneopentyl (meth)acrylates, as monomers of group (a), in the absence of other monomers. Copolymers of di-$C_1$-$C_3$-alkylaminoneopentyl acrylates or of di-$C_1$-$C_3$-alkylaminoneopentyl methacrylates contain not less than 5% by weight, preferably from 20 to 95% by weight, of the monomers (a) as copolymerized units. $C_1$-$C_3$-Alkyl is methyl, ethyl, n-propyl or isopropyl.

Preferred copolymers contain (a) from 20 to 95% by weight of neutralized or quaternized di-$C_1$-$C_3$-alkylaminoneopentyl acrylate as copolymerized units and, as comonomers of group (b), from 5 to 80% by weight of amides of ethylenically unsaturated $C_3$-$C_5$-carboxylic acids, di-$C_1$-$C_3$-alkylamino-$C_2$-$C_4$-alkyl acrylates or methacrylates and/or di-$C_1$-$C_3$-alkylamino-$C_2$-$C_4$-alkylene(meth)acrylamides as copolymerized units. Examples of comonomers of the above type are acrylamide, methacrylamide and aminoalcohol esters of acrylic acid and methacrylic acid, eg. dimethylaminoethyl acrylate, diethylaminoethyl acrylate, dimethylaminoethyl methacrylate, diethylaminoethyl methacrylate, diethylaminopropyl acrylate, diethylaminopropyl methacrylate and dimethylaminobutyl acrylate. Examples of dialkylaminoalkylene(meth)acrylamides are compounds of the formula

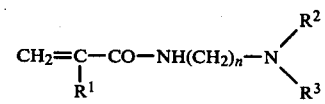

where $R^1$ is H or $CH_3$, $R^2$ and $R^3$ are $C_1$-$C_3$-alkyl and n is from 2 to 4. Examples of compounds of this type are N,N-dimethylaminopropylacrylamide, N,N-dimethylaminopropylmethacrylamide and N,N-diethylaminobutylacrylamide.

The basic monomers are employed in neutralized or quaternized form for the polymerization. Inorganic or organic acids, eg. sulfuric acid, hydrochloric acid, phosphoric acid and acetic acid, are used for the neutralization, and examples of suitable quaternizing agents are methyl chloride, ethyl chloride, dimethyl sulfate, diethyl sulfate, benzyl chloride and lauryl chloride.

In addition to the above comonomers (b), the polymers can contain not more than 20% by weight of another group (c) of monomers. Monomers of this group are acrylates and methacrylates of monohydric $C_1$-$C_{12}$-alcohols, acrylonitrile, methacrylonitrile, vinyl esters of saturated $C_2$-$C_4$-carboxylic acids, diisobutylene and styrene. The monomers are used in the polymerization in such an amount that water-soluble polymers are formed. The copolymers can also be modified by copolymerization of ethylenically unsaturated $C_3$-$C_5$-mono or di-carboxylic acids, maleic anhydride, vinylsulfonic acid, vinylbenzenesulfonic acid, acrylamidopropanesulfonic acid or the alkali metal or ammonium salts of the above carboxylic acids. This modification is effected by, for example, polymerization of a monomer combination of dimethylaminoneopentyl acrylate, dimethylaminoethyl acrylate and acrylic acid or a mixture of dimethylaminoneopentyl acrylates, acrylamide and sodium acrylate.

The polymerization temperature can vary within a wide range, for example from 0° to 120° C. As a rule, the polymerization is carried out under atmospheric pressure and at from 20° to 80° C., care being taken that the components are mixed thoroughly. The monomers are virtually completely polymerized. If polymers with a particularly low residual monomer content are required, the main polymerization can be followed by post-polymerization. The polymers preferably have molecular weights above 1 million, and they are more closely defined by their Fikentscher K value, which is from 150 to 300, preferably from 170 to 250.

The high molecular weight water-soluble homopolymers and copolymers are used, according to the invention, as flocculants for waste water and sludges. The waste water may originate from municipal or industrial sewage plants. In that case the homopolymers and copolymers are used to clarify the waste water. However, they can also be used for flocculation of sludge from municipal sewage plants and of activated sludge from industrial waste water purification plants. The solids content of the sludge is from about 2 to 8% by weight. Addition of the flocculant used according to the invention to the sludge gives an easily filterable or centrifugeable residue with a solids content of not more than 30% by weight. The amount of flocculant used is from 100 to 350 g per m³ of sludge, or, for clarifying waste water, from 1 to 20 g per m³ of waste water.

The homopolymers or copolymers which contain neutralized or quaternized di-$C_1$-$C_3$-alkylaminoneopentyl (meth)acrylate as copolymerized units and which are used according to the invention have a more powerful flocculating effect than the conventional cationic flocculants, as is shown by the fact that maximum flocculation is achieved with a smaller amount of flocculant. In contrast to aqueous solutions of conventional cationic polymers, aqueous solutions of polymers containing dialkylaminoneopentyl (meth)acrylate retain their activity as flocculants, ie. the activity of the aqueous polymer solutions is highly stable, so that, once prepared, polymer solutions do not have to be used immediately but can be stored for a prolonged period before being used as flocculants. In the Examples, parts and percentages are by weight. The K values of the polymers are measured in 5% strength aqueous sodium chloride solution at 25° C. by the method of H. Fikentscher, Cellulosechemie 13, 58–64 and 71–74 (1932); $K = k \cdot 10^3$.

PREPARATION OF THE POLYMERS (GENERAL METHOD)

The components of the oil phase whose composition is given in Table I were mixed in a vessel equipped with a stirrer, thermometer and nitrogen inlet and outlet. The aqueous monomer phase (for the composition, again cf. Table I) was stirred into this mixture. Nitrogen was passed through the emulsion for 30 minutes, and the emulsion was then heated to 60° C. in the course of 15 minutes. A solution of the initiator (for the type and amount, cf. Table I) in a little acetone was added at this temperature, and the mixture was kept at from 60° to 65° C. for 2 hours. The same amount of the polymerization initiator was then again added and the reaction mixture was post-polymerized at 65° C. for 2 hours. A coagulate-free and sedimentation-stable water-in-oil polymer emulsion was obtained.

TABLE I

| Composition of the water-in-oil emulsions for the preparation of the polymers | | 1 | A | 2 | B |
|---|---|---|---|---|---|
| Oil phase | | | | | |
| Hydrocarbon mixture (boiling range 192–254°C.)[1] | [g] | 200 | 200 | 220 | 220 |
| Emulsifier according to German Laid-Open Application DOS 2,557,324[2] | [g] | 40 | 40 | 35 | 35 |
| Reaction product of 1 mole of nonylphenol and 10 moles of ethylene oxide | [g] | 7.5 | 7.5 | 6 | 6 |
| Monomer phase | | | | | |
| Distilled water | [g] | 225 | 227 | 369 | 369 |
| Acrylamide | [g] | 40 | 40 | 190 | 195 |
| 37.5% strength sulfuric acid | [g] | 203 | 205 | 61 | 60 |
| Diethylaminoethyl acrylate | [g] | — | 280 | — | 33 |
| Dimethylaminoneopentyl acrylate | [g] | 284 | — | 87 | — |
| Formic acid | [g] | — | — | 0.15 | 0.15 |
| 2,2′-Azo-bis-isobutyronitrile | [g] | 2 × 0.2 | 2 × 0.2 | 2 × 0.15 | 2 × 0.15 |

[1] Mixture of 84% of saturated aliphatic and 16% of naphthenic hydrocarbons
[2] Reaction product of 1 mole of oleyl glycidyl ether, 1 mole of glycerol and 2 moles of ethylene oxide

TABLE II

| Characterization of the polymers | | 1 | A | 2 | B |
|---|---|---|---|---|---|
| Polymer content of the emulsion | [%] | 40 | 40 | 30 | 30 |
| Composition of the polymer | | | | | |
| Acrylamide | [% by weight] | 10 | 10 | 63 | 65 |
| Diethylaminoethyl acrylate | [% by weight] | — | 90 | — | 35 |
| Dimethylaminoneopentyl acrylate | [% by weight] | 90 | — | 37 | — |
| K value | | 180 | 134 | 216 | 197 |

To test the effectiveness of the above polymers, aqueous polymer solutions were prepared from the water-in-oil polymer emulsions by the process disclosed in U.S. Pat. No. 3,624,019. For this, the emulsions were stirred into water containing 2%, based on the polymer emulsion, of nonylphenol which had been reacted with 10 moles of ethylene oxide. Water was then added in an amount such that the polymer content was 0.1%. These 0.1% strength aqueous polymer solutions were used in the Examples which follow.

TEST METHODS (a) Determination of the flocculation number 750 ml of waste water or sludge are treated with defined amounts of a 0.1% strength aqueous flocculating solution in a 1 l measuring cylinder. Flocculation occurs virtually instantaneously. The contents of the measuring cylinder are then emptied into a Büchner funnel and filtered. The flocculation is evaluated visually with the aid of the filter.

Flocculation number 1 = no visible flocculation
Flocculation number 2 = slight flocculation
Flocculation number 3 = average flocculation
Flocculation number 4 = good flocculation, sufficient for most practical purposes
Flocculation number 5 = very good, optimum flocculation (b) Flocculating activity In this test, the amount of flocculant which must be added to waste water or sludge to achieve optimum flocculation (flocculation number = 5) is determined, again in a 1 l measuring cylinder.

EXAMPLE 1

The flocculating activity of polymer 1 and polymer A (comparison) was determined on digested sludge from a municipal sewage plant by the method described above under (b). The optimum amount of polymer 1 for flocculation was 250 mg/l of sludge, while the amount of polymer A which had to be used was 350 mg/l of sludge. Accordingly, polymer 1 is distinctly more effective than the prior art polymer A.

EXAMPLE 2

0.1% strength aqueous solutions of polymer 2 and polymer B were kept at 23° C. for up to 24 hours. The flocculation number of the aqueous polymer solutions was determined after specific intervals of time, which are shown in Table III. The flocculation number was determined with the aid of digested sludge from a municipal sewage plant.

TABLE III

| | Flocculation number after | | | | |
|---|---|---|---|---|---|
| | 0 | 1 | 4 | 7 | 24 hours |
| 200 mg of polymer 2/1 | 5 | 5 | 5 | 5 | 4 |
| 250 mg of polymer B/1 | 5 | 5 | 4 | 3–4 | 2 |

From the Table, it can be seen that the aqueous solution of the polymer 2 used according to the invention is substantially more stable than that of the conventional flocculant polymer B.

We claim:

1. A process for flocculating sludge from municipal sewage plants and activated sludge from industrial waste water treatment plants which comprises adding 100 to 350 grams per cubic meter of sludge of a storage-stable flocculant comprising a water-soluble copolymer having a Fikentscher K value of from 150 to 300, wherein said copolymer is prepared by copolymerizing (a) 20–95% by weight of a neutralized or quaternized di-$C_1$-$C_3$-alkylaminoneopentyl (meth)acrylate with (b) 5–80% by weight of acrylamide; thereby causing flocculation of said sludge and separating the flocculated solids from said sludge.

2. The process for flocculating sludge of claim 1, wherein the solids content of the sludge from municipal sewage plants and of the activated sludge from industrial waste treatment plants is about 2 to 8% by weight.

3. The process for flocculating sludge of claim 1, wherein the addition of said flocculant to said sludge produces an easily filterably or centrifugeable residue having a solids content of not more than about 30% by weight.

* * * * *